United States Patent [19]

Kato

[11] Patent Number: 4,829,387

[45] Date of Patent: May 9, 1989

[54] ROTARY HEAD TYPE DIGITAL SIGNAL REPRODUCING DEVICE FOR CONTROLLING TAPE SPEED ACCORDING TO A TRACKING ERROR

[75] Inventor: Takahiro Kato, Saitama, Japan

[73] Assignee: Pioneer Electronic Corporation, Tokyo, Japan

[21] Appl. No.: 138,125

[22] Filed: Dec. 28, 1987

[30] Foreign Application Priority Data

Dec. 27, 1986 [JP] Japan .................. 61-315222

[51] Int. Cl.$^4$ ............... G11B 5/584; G11B 15/46
[52] U.S. Cl. .................. 360/32; 360/73.09; 360/77.13
[58] Field of Search ............ 360/73, 77, 32

[56] References Cited

U.S. PATENT DOCUMENTS

| | | | |
|---|---|---|---|
| 3,851,116 | 11/1974 | Cannon | 360/73 |
| 4,586,093 | 4/1986 | Fukuju et al. | 360/73 |
| 4,604,658 | 8/1986 | Hibino et al. | 360/32 |
| 4,663,679 | 5/1987 | Sekiguchi et al. | 360/73 |

Primary Examiner—Alan Faber
Assistant Examiner—Kevin J. Fournier
Attorney, Agent, or Firm—Sughrue, Mion, Zinn, Macpeak & Seas

[57] ABSTRACT

A rotary head type digital signal reproducing device for reproducing digital signals recorded on a tilted track of a magnetic tape. The recording device includes rotary heads HA,HB which reproduce digital signals recorded on the magnetic tape; a memory 23, connected to the rotary heads, for storing the reproduced signals; a correcting circuit 24, connected to the memory, for correcting signal errors in the stored digital signals; a digital to analog converter 25, connected to the correcting circuit, for converting the digital signals to analog signals; a tracking circuit 27, connected to the memory, for generating a tracking error signal from the digital signals; and a reel motor 28, connected to the tracking circuit, for controlling a reel 16 of the magnetic tape in accordance with the tracking error signal.

11 Claims, 2 Drawing Sheets

ROTARY HEAD TYPE DIGITAL SIGNAL REPRODUCING DEVICE FOR CONTROLLING TAPE SPEED ACCORDING TO A TRACKING ERROR

FIELD OF THE INVENTION

The present invention relates in general to a rotary head type digital signal reproducing device which reproduces an analog audio signal from a digitally recorded signal. More particularly, the invention relates to a reproducing device for use in, for example, R-DAT of 8 mm video tape recorders.

BACKGROUND OF THE INVENTION

In prior art R-DAT recorders, PCM audio data is recorded on, and reproduced from, a tilted track of magnetic tape. When recording or reproducing the audio signal, it is generally required, for accuracy reasons, that the tape run at a constant specified speed. In order for the magnetic tape to run at the specified speed, it is driven by a capstan and a pinch roller, with the rotation of the capstan being controlled according to a tracking error signal.

Besides running the magnetic tape at the specified recording or reproducing speed, it is also desirable to run the tape at relatively high speeds, for example, when an operator wishes to search for a particular location (e.g. ID subcode signal) on the tape. In searching for the particular location, the magnetic tape is caused to run at a speed which may be 200 times that of the recording or reproducing speed (e.g. the tape speed during recording or reproducing). Since it is difficult to realize such a high speed with only the capstan and the pinch roller, may prior art recorders include a driving mechanism, coupled to the tape reel, for driving the tape at these high speeds. More particularly, a reel support for the tape reel is driven through a belt and gear mechanism by a capstan motor which also rotates the capstan. Alternatively, some recorders include a reel motor, in addition to the capstan motor, for driving the reel support.

However, the above prior art recorders have disadvantages since these recorders require the use of a pinch roller, a capstan, a capstan motor, and a reel motor. These components necessarily complicate the recorder, thereby making it expensive. Although some recorders do not require a reel motor (i.e. the reel support is driven by the capstan motor) such recorders still include a capstan, a relatively large capstan motor for high speed tape feed, and a gear and clutch mechanism for selectively switching between the recording or reproducing tape speed and the high tape speed.

Thus, it is an object of the present invention to provide a recorder which does not require pinch rollers, capstans, or complicated mechanisms for switching between different tape speeds.

SUMMARY OF THE INVENTION

The present invention accomplishes this and other objects by providing a rotary head type digital signal reproducing device, comprising a rotary head for reproducing digital signals recorded on the tilted track of a magnetic tape, a memory for storing the reproducing signals from the rotary head, a correcting circuit for correcting signal errors in the reproduced signals, a digital to analog (D/A) converter for converting the corrected signal to an analog signal, a tracking circuit for generating a tracking error signal from the reproduced signal, and a reel motor for controlling the rotation of a reel of magnetic tape in accordance with the tracking error signal.

DETAILED DESCRIPTION OF THE INVENTION

An embodiment of the present invention will now be explained in connection with a R-DAT recorder. In R-DAT recorders, data is recorded on each track in the form of 196 blocks, and the PCM data therefrom is recorded in the form of 128 blocks. Moreover, these PCM blocks are given respective block addresses, thereby allowing a total of 128 blocks to be identified for a given track. The PCM data is also given a frame address in terms of adjacent two tracks in different azimuth angles at the rate of one assignment for every two blocks. These frame addresses are sorted through 16 different addresses (i.e. from 0 to 15), and the addresses are sequentially given in the period of 16 frames, namely in the period of 32 tracks.

The following explanation is based on the R-DAT data format explained above.

Figure 1:
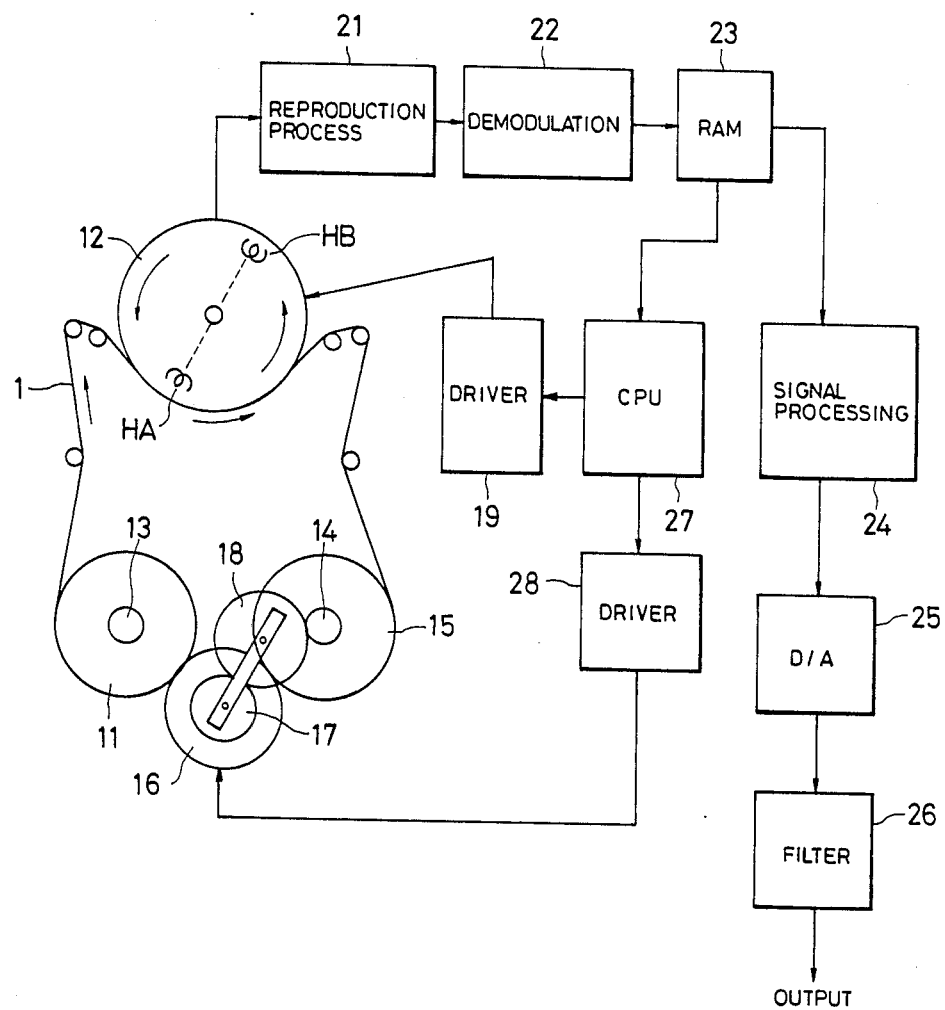
FIG. 1 is a cross-sectional diagram of a magnetic tape for explaining the rotary head scanning operation of the invention.

In FIG. 1, the magnetic tape is running at the same speed as it was running during the recording operation. The recording tracks Ta, Tb in the azimuth angles a and b, respectively, are formed alternately on magnetic tape 1. A rotary head drum 12 (FIG. 2) is rotated at twice the tape recording speed. As a result, the head scanning locus 2 is equal to twice the scanning locus of the head HA (FIG. 2) having the azimuth angle a, since the drum is rotated at twice the tape recording speed. The scanning locus of head HB, having the azimuth angle b, is not illustrated, but it is located at an intermediate position of the scanning locus 2 of head HA. Those skilled in the art will understand that when the number of rotations of the drum 12 is doubled, the scanning pitch of the head in the longitudinal direction of the tape 1 reduces to one-half ($\frac{1}{2}$) of the scanning pitch when the number of rotations is equal to the tape recording speed. Similarly, when the number of drum rotations is n-folded, the scanning pitch of the head reduces to 1/n.

The reproducible part of head HA corresponds to that portion of the track having the same azimuth angle as head HA, and is indicated as the hatched regions in FIG. 1. In FIG. 1, head HA scans through the total region of the track Ta of azimuth a. However, track Ta is perfectly reproduced when the head HA scans through the track three times, in other words when the drum rotates three times that of the tape recording speed. In this case, reproduction would be carried out in the sequence of x,y,z, however, this sequence does not match the recording sequence of z,y,x. As explained previously, the digital data of one track is divided into a plurality of blocks, and each block is given frame and block addresses. Therefore, it is possible for the reproduced signals to be written into the memory 23 (FIG. 1) depending on these addresses, and the written data may be rearranged into the original (e.g. recording) sequence of frame and block addresses.

Accordingly, even if the tilt angle of the scanning head is different from the tilt angle of the recording track, as is the case in FIG. 1, the digital signal can be reproduced as if both tilt angles are correctly matched. If some data is reproduced in duplicate, the duplicate portion can be detected, and then discarded. On the other hand, if the head does not scan through a certain portion of a track, thereby skipping a recorded portion of the tape, the skipped recorded portion can still be reproduced by increasing the number of rotations of the drum.

Moreover, it is also possible, in order to enhance the reliability of reproduction, to increase the number of rotations of the head drum, intentionally read out data in duplicate, and then accurately select the reproduced data.

It is also possible to define the relationship between, for example, the head HB and the track Tb, and therefore reproduce the track perfectly even if there is a deviation between the track and head angles.

Figure 2:
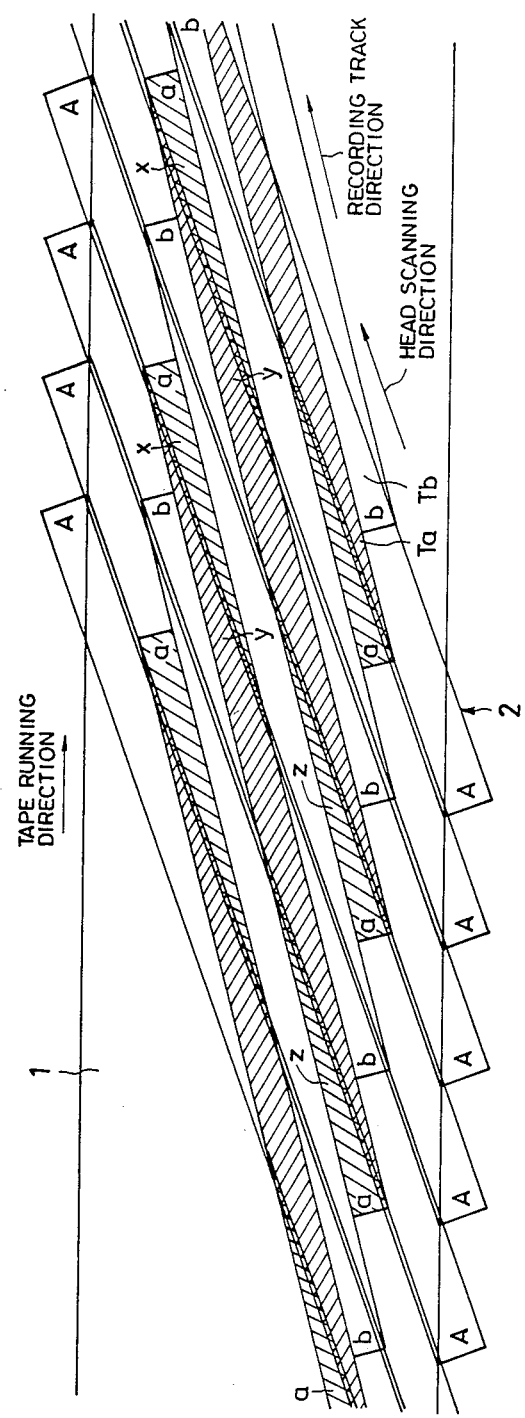
FIG. 2 is a block diagram of a rotary type digital reproducing device according to the invention.

In FIG. 2, tape 1 is unwound from a supply reel 11 to the rotating drum 12 at an inclination angle of 90 degrees. The drum 12 includes reproducing heads HA and HB which are spaced between each other at an angular interval of 180 degrees. As indicated in FIG. 1, the drum 12 is rotated at twice the recording speed. This is accomplished through a driver 19 which drives drum 12 in the directions indicated by the curved arrows. After tape 1 is fed along the surface of drum 12, it is then wound onto the take-up reel 15.

The digital signals reproduced by the rotary heads HA and HB as tape 1 is fed along the surface of drum 12 are supplied to a reproducing process circuit 21 consisting of an RF amplifier, an equalizer, and an PLL. The output of the processing circuit 21 is then supplied to a demodulating circuit 22. The demodulated data from circuit 22 is written into a predetermined position of the memory (RAM) 23 depending upon its frame and block address, and then rearranged into the original recorded sequence. Data from RAM 23 is then supplied to a signal processing circuit 24 where it is subjected to error correction and deinterleave. The processed signal from circuit 24 is then supplied to a D/A converter 25 and a low-pass filter 26, for converting the processed digital signal to the original analog audio signal.

In FIG. 2, data is read from RAM 23 at a constant speed according to the timing of a clock pulse having a crystal accuracy. The data written into RAM 23 is carried out at a speed depending on the reproducing tape speed (e.g. the tape speed during reproduction). Thus, as the reproducing tape speed increases, the speed in which data is written into RAM 23 also increases. Similarly, as the tape speed during reproduction decreases, so does the speed in which data is written into RAM 23.

In FIG. 2, the amount of data stored in RAM 23 at a given time can be calculated from the difference between the frame and block addresses of data read out from RAM 23 and those of data written into RAM 23.

More particularly, these addresses are supplied to CPU 27 from RAM 23, where the difference between the addresses are calculated. CPU 27 controls a driver 28 depending on the calculated address differences. The driver 28 supplies a control signal which controls the reel motor 16 which in turn controls the tape speed. Accordingly, when the difference between the addresses exceeds a certain value, namely when too much data is supplied to RAM 23, the speed of reel motor 16 is lowered, thereby decreasing the amount of data supplied to RAM 23. When the difference between the addresses drops below the certain value, the speed of the reel motor 16 is increased, thereby increasing the amount of data supplied to RAM 23. In the situation in which the amount of data supplied to RAM 23 is at the certain value, the tape supply is controlled so that the speed of reel motor 16 is maintained.

Thus, the invention is designed to adjust the tape speed when too little or too much data is supplied to RAM 23, thereby maintaining the specified or accurate tape speed during reproduction. More particularly, the CPU 27 serves to act as a tracking circuit and to generate a tracking error signal which is supplied to driver 28 when the tape speed is too fast or too slow. The driver 28 then supplies a signal, in response to the tracking error signal, to a reel motor 16 for controlling its rotation. The rotation of reel motor 16 is then transmitted to the take-up reel support 14 through gears 17 and 18. As a result, the magnetic tape 1 may be controlled so that its speed corresponds to that of the recording and reproduction speeds.

Thus, even when the tracking circuit which is usually provided with R-DAT recorders is eliminated, the invention allows the audio signal to be reproduced.

In the situation in which the magnetic tape 1 is caused to run at a high speed (i.e. 200 times that of the tape recording speed) in, for example, the high speed search of an ID subcode signal, it may be realized by simply increasing the number of rotations of reel motor 16.

It is also obvious from FIG. 2 that magnetic tape 1 can be caused to run at the recording speed or at the high speed in the reverse direction by rotating the gear 18 and then, coupling it with the supply reel support 13.

In the above embodiment, one tilted track is scanned several times by making the running speed of the rotary head greater than that of the recording speed. However, the present invention is also applicable to other recorders. For example, the invention is applicable to a magnetic tape which is wound at an angle of 180 degrees onto a drum which has a diameter of 15 mm and one head of double gaps (+ — azimuth) positioned thereon. In this arrangement, the drum is rotated at a speed of 4,000 rpm, and data is recorded by applying a recording current alternately to the double gaps. The resulting recording pattern formed in this arrangement is similar to that obtained when a magnetic tape is wound at an angle of 90 degrees to a drum having a diameter of 30 mm, two heads positioned thereon, and a drum rotational speed of 2,000 rpm. In this arrangement, reproduction is carried out by winding the magnetic tape at a 90 degree angle to a drum having a diameter of 30 mm and two rotary heads, and setting the number of rotations at 4,000 rpm. Similarly, in the case in which the magnetic tape is wound at an angle of 90 degrees to a drum having a diameter of 30 mm and including four reproduction heads with the reproducing sequence being ($A_1$, $B_1$, $A_2$, $B_2$) the number of drum rotations would be set to 2,000 rpm.

In addition, those skilled in the art will understand that the invention may be implemented in a recorder in which the tracking error signal is generated from an ATF signal, with the intrinsic tracking circuit of the recorder serving to control the reel motor 16 through the driver 28. In this case, a rotary drum 12 (rotary heads HA, HB) is rotated at the same speed as that in the ordinary recording and reproducing operations, and the magnetic tape 1 is also caused to run at almost the same speed as that during the recording and reproducing operations. Although, it may be difficult to realize similar tracking control as that when the capstan and pinch roller are used, the audio signal may still be reproduced correctly since the signal error can be corrected in the signal processing circuit 24, which would be acting as the error correcting circuit.

In conclusion, the present invention comprises, a rotary head which reproduces digital signals recorded on the tilted tracks of a magnetic tape, a memory which stores signal outputs from the rotary head, a correcting circuit which corrects errors of signals stored in the memory, an D/A converter which converts the digital signal to an analog signal, a tracking circuit which generates a tracking error signal from the digital signal, and a reel motor which controls the rotation of the magnetic tape reel in accordance with the tracking error signal. Thus, the present invention allows for the capstan, pinch roller and capstan motor to be eliminated, thereby simplifying the recorder and saving production costs.

It is understood that the invention is limited only by the following claims.

What is claimed is:

1. A reproducing device for reproducing digital signals recorded on a recording tape, the digital signals recorded on the recording tape being addressed, the device comprising:

means, coupled to the recording tape, for reproducing addressed digital signals recorded on the recording tape;

memory means, coupled to said reproducing means, for receiving the reproduced addressed digital signals from the reproducing means and for storing the reproduced addressed digital signals therein, said memory means storing the reproduced addressed digital signals at a rate depending on the speed of the recording tape;

tracking means, coupled to said memory means, for generating a tracking error from the difference between the address of a first reproduced digital signal which is being written into said memory means and the address of a second reproduced digital signal which is being read out from said memory means; and means for controlling the speed of the recording tape according to the generated tracking error, thereby controlling the rate in which the reproduced addressed digital signals are supplied to said memory means.

2. The reproducing device according to claim 1, wherein the reproducing device is a rotary head type digital signal reproducing device, and wherein said reproducing means is a first rotary head.

3. The reproducing device according to claim 1, further comprising: a correcting circuit, connected to said memory means, for correcting a signal error of a digital signal received from said memory means; and a digital to analog converter connected to said correcting circuit for converting the corrected digital signals into analog signals.

4. The reproducing device according to claim 1, wherein said controlling means comprises a reel associated with the recording tape, and a reel motor for controlling said reel.

5. The reproducing device according to claim 4, further comprising a rear coupled to said reel, and a take-up reel coupled to said gear.

6. The reproducing device according to claim 1, wherein the digital signals recorded on the recording tape are addressed according to frame and block addresses.

7. The reproducing device according to claim 2, further comprising a drum having said first rotary head positioned thereon.

8. The reproducing device according to claim 7, wherein said drum has a second rotary head positioned thereon, and wherein said first and second rotary heads are spaced from each other at an angular interval of 180 degrees.

9. The reproducing device according to claim 1 wherein said tracking means is a central processing unit.

10. The reproducing device according to claim 9, further comprising a driver coupled to said central processing unit for driving said reproducing means.

11. The reproducing device according to claim 8, further comprising a driver, connected to said tracking means for rotating said drum at substantially twice a recording speed of the tape.

* * * * *